United States Patent
Negi et al.

(10) Patent No.: US 12,130,791 B2
(45) Date of Patent: Oct. 29, 2024

(54) ENHANCED LOCKING MECHANISM FOR B+ TREE DATA STRUCTURES

(71) Applicant: VMware, Inc., Palo Alto, CA (US)

(72) Inventors: Hardik Singh Negi, Palo Alto, CA (US); Wenguang Wang, Santa Clara, CA (US); Eric Knauft, Palo Alto, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/144,797

(22) Filed: May 8, 2023

(65) Prior Publication Data

US 2023/0281180 A1   Sep. 7, 2023

Related U.S. Application Data

(63) Continuation of application No. 17/177,686, filed on Feb. 17, 2021, now Pat. No. 11,663,186.

(51) Int. Cl.
| | |
|---|---|
| *G06F 16/22* | (2019.01) |
| *G06F 16/23* | (2019.01) |
| *G06F 16/2455* | (2019.01) |
| *G06F 16/28* | (2019.01) |
| *G06F 16/901* | (2019.01) |

(52) U.S. Cl.
CPC ...... *G06F 16/2246* (2019.01); *G06F 16/2343* (2019.01); *G06F 16/24552* (2019.01); *G06F 16/288* (2019.01)

(58) Field of Classification Search
CPC ............. G06F 16/2246; G06F 16/2343; G06F 16/288; G06F 16/24552
See application file for complete search history.

(56) References Cited

U.S. PATENT DOCUMENTS

| | | |
|---|---|---|
| 8,868,531 B2 | 10/2014 | Majnemer |
| 8,909,677 B1 | 12/2014 | Aguilera |
| 9,208,258 B2 | 12/2015 | Spillane |
| 9,275,096 B2 | 3/2016 | Strain |

(Continued)

OTHER PUBLICATIONS

Jorgensen II, Edward R. Coarse-Grained, Fine-Grained, and Lock-Free Concurrency Approaches for Self-Balancing B-Tree. Diss. University of Nevada, Las Vegas, (Year: 2019).*

(Continued)

*Primary Examiner* — Mohsen Almani
(74) *Attorney, Agent, or Firm* — King Intellectual Asset Management

(57) ABSTRACT

A method for modifying key-value pairs of a B+ tree is provided. The method receives a request to modify a particular key-value pair. Each node of the tree has a modification number. The method traverses a path on the tree from the root node toward the particular node. The traversing includes upon reaching a parent node of the path, acquiring a shared lock on both the parent node and a child node one level below the parent node. Upon determining that the child node is the particular node, the method stores the modification number of the particular node, releases the shared lock on the particular node, compares a current modification number of the node with its stored number, and acquires an exclusive lock on the node if the numbers are the same. The method increments the current modification number of the node and modifies it while in the exclusive lock.

20 Claims, 7 Drawing Sheets

(56) References Cited

U.S. PATENT DOCUMENTS

| | | | |
|---|---|---|---|
| 2004/0107186 A1 | 6/2004 | Najork | |
| 2010/0076940 A1* | 3/2010 | Bordawekar | G06F 16/9027 707/704 |
| 2012/0221531 A1 | 8/2012 | Liedes | |
| 2013/0185271 A1* | 7/2013 | Strain | G06F 16/9027 707/704 |
| 2013/0204902 A1* | 8/2013 | Wang | G06F 16/2365 707/E17.012 |
| 2013/0318126 A1* | 11/2013 | Graefe | G06F 16/2246 707/E17.012 |
| 2015/0347495 A1 | 12/2015 | Wang | |
| 2019/0034507 A1 | 1/2019 | Duttagupta | |
| 2021/0357419 A1 | 11/2021 | Li | |

OTHER PUBLICATIONS

Shasha, Dennis, Vladimir Lanin, and Jeanette Schmidt. An Analytical Model for the Performance of Concurrent B Tree Algorithms. Ultracomputer Research Laboratory, Univ., Courant Inst. of Mathematical Sciences, Division of Computer Science (Year: 1987).*

Sagiv, Yehoshua; "Concurrent Operations on b-trees with overtaking"; Proceedings of the fourth ACM SIGACT-SIGMOD symposium on principles of database systems; 1985; pp. 28-37; Jerusalem, Israel.

Kwong, Yat-Sang; et al; "A new method for concurrency in B-trees"; IEEE Transactions on Software Engineering; 1982; pp. 211-221; vol. SE-8, No. 3; IEEE.

Karnagel, Tomas, et al; "Improving in-memory database index performance with Intel® Transactional Synchronization Extensions"; 2014 IEEE 20th International Symposium on High Performance Computer Architecture (HPCA); 2014; 12 Pages; IEEE.

Braginsky, Anastasia, et al; "A lock-free B+ tree"; Proceedings of the twenty-fourth annual ACM symposium on Parallelism in algorithms and architectures; 2012; pp. 58-67; Pittsburgh, PA.

Srinivasan, Venkathachary, et al; "Performance of B+ tree concurrency control algorithms"; The VLDB Journal; 1993; vol. 2; pp. 361-406.

Graefe, Geotz; "A survey of B-tree locking techniques"; On Transactional Concurrency Control 2019; Jul. 2010; vol. 35, No. 3, Article 16; pp. 17-43.

Kedem, ZM, et al; "Locking protocols: from exclusive to shared locks"; Journal of the ACM (JACM); 1983; pp. 787-804; vol. 30, No. 4; ACM.

Cha, Sang K. et al; Cache-Conscious Concurrency Control of Main-Memory Indexes on Shared-Memory Multiprocessor Systems; Proceeding of the 27th VLDB Conference; Roma, Italy; 2001; 10 pages.

Rodeh, Ohad; B-trees, Shadowing, and Clones, ACM Transactions on Computational Logic; vol. V, No. N; Aug. 2007, pp. 1-26.

* cited by examiner

ENHANCED LOCKING MECHANISM FOR B+ TREE DATA STRUCTURES

CLAIM TO BENEFIT OF EARLIER FILED PATENT APPLICATIONS

This application is a continuation application of U.S. application Ser. No. 17/177,686, filed on Feb. 17, 2021, which is incorporated herein by reference in its entirety.

BACKGROUND

The amount of data worldwide grows each year, thus requiring more storage resources. Further, protecting the already stored data (e.g., in a datacenter) against disastrous events, such as storage failure or cyber-attacks, which can completely disrupt the business operations, is essential for every enterprise. An enterprise may need to store data, or to back up the already stored data, at some storage devices outside the enterprise (e.g., in the cloud) to leverage the cheap storages provided by other vendors, as well as, in case the original data is damaged or lost, restore and use the backed up data, for example, through a disaster recovery process. Therefore, it is increasingly important to store data (e.g., related with virtual machines (VMs) or other types of virtual computing instances (VCIs) of a datacenter) in one or more other data storages that offer low cost and high efficiency.

Some datacenters may store the objects (e.g., VM disks) separately from metadata that defines the objects. For example, the objects may be stored in one data storage using a first data structure, while the metadata is stored in another data storage using a second data structure. The metadata (e.g., objects' identifiers) may be stored concurrently by several compute nodes (e.g., metadata servers) as key-value data structures to allow for scalable I/O operations. B+ trees are frequently used as data structures for storing the metadata. A B+ tree is typically a multi-level data structure having a plurality of nodes, each node containing one or more key-value pairs, which is a tuple include a key and a value associated with the key. A key is an identifier of data and a value is either the data itself or a pointer to a location (e.g., in memory or on disk) of the data associated with the identifier. More specifically, a B+ tree's top level generally includes a root node of the tree, which has no parent node. The middle level(s) of a B+ tree include(s) branch nodes which have both parent and child nodes. The bottom level of a B+ tree includes the leaf nodes which have no more children. In a B+ tree, the values in the root and middle nodes include pointers to the next level nodes or children, while the values in the leaf nodes include the real data or pointers to where the real data is stored.

A B+ tree may be sorted according to the keys of the tuples, and data can be read/written from the tree based on the key associated with the data. Because B+ trees contain sorted tuples, any read/write operation on the tree requires a traversal of the tree to find the desired tuple based on the corresponding key. For example, upon receiving a write instruction on a particular node, a writer (e.g., a metadata server) may start traversing the tree from the root node to the particular node and perform the write operation on the node. Since there are several other servers that are concurrently performing read/write operations on different nodes of a B+ tree, there is always a possibility that at least one other server has the same node on its traversal path. As such, each server (e.g., reader or writer) may implement a locking mechanism for locking the nodes while traversing the tree. Lock coupling (or lock crabbing) is a popular locking mechanism in which at any point of time during traversing the tree a server locks a pair of parent-child nodes to prevent other servers from changing the data in the pair.

Two types of locks include shared locks and exclusive locks. When a node has a shared lock on it, the data in the node can be read by several servers, but it cannot be changed by any of the servers. Conversely, when a server acquires an exclusive lock on a node, no other server can read or write the data in the locked node. Conventional datastores often use exclusive locks on every parent-child pair that is on a traversal path when performing a write operation on a node, where the exclusive locks are needed only when the nodes (and/or their children nodes) are merged or splitted. Additionally, current datastores may use exclusive locks on every parent-child pair when performing a copy on write (COW) operation on, for example, cloned nodes, where the exclusive locks are needed when the child node is shared. In most of the above cases, the exclusive locks are not necessary and thus considered an overuse of the exclusive locks. Overusing exclusive locks, however, may negatively impact the concurrency of I/O operations on a B+ tree. For example, in a highly concurrent environment, several competing servers may be blocked by the exclusive locks unnecessarily. Additionally, if a server fails to obtain an exclusive lock on a particular node, current retrying mechanisms to obtain the lock on the node are not efficient and may slow down the overall performance of the servers.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
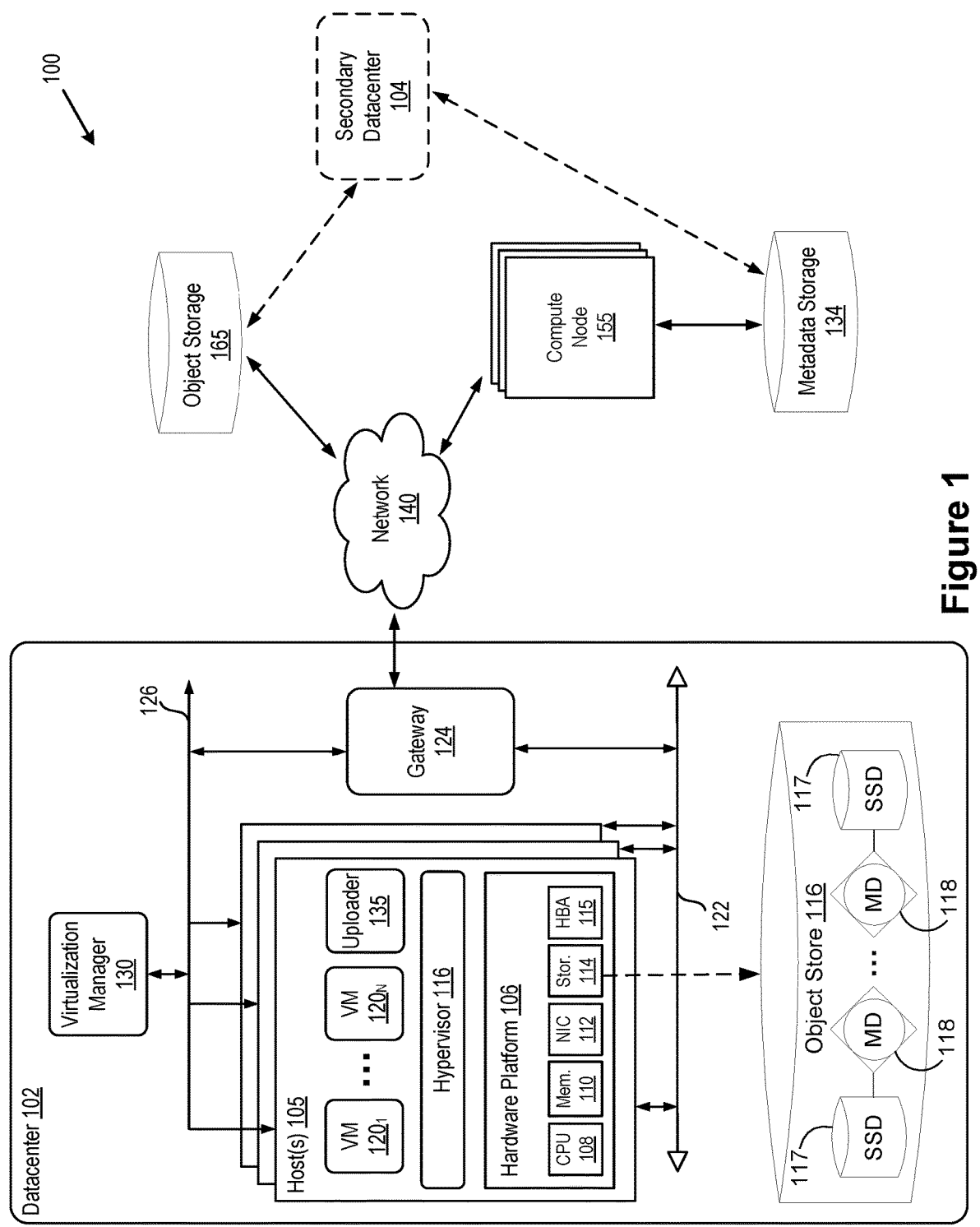
FIG. 1 is a block diagram illustrating a computer system in which one or more embodiments of the present application may be utilized.

A datastore, such as a distributed datastore such as a virtual storage area network (vSAN) datastore, may store data separately from the metadata. For example, a vSAN datastore may store data associated with an object (e.g., a VM disk) in an object storage and store the metadata associated with the stored object in a separate metadata storage. The metadata may include, but is not limited to, objects identifiers (IDs), logical block addresses where each object is stored, a hash of each block, chunk IDs and their corresponding offsets, etc. The metadata may be read/written concurrently from/to one or more key-value data structures by one or more compute nodes (e.g., may also be referred to as readers and/or writers) to allow for scalable I/O operations. Each key-value data structure may store the data using a B+ tree data structure. In order to avoid multiple writers modifying the same data stored in a B+ tree at the same time, each writer may use a locking mechanism to lock the nodes while traversing the tree. For example, a compute node may leverage a lock coupling mechanism in which an exclusive lock is obtained on each pair of parent-child that is placed on the traversing path of the tree. Using exclusive locks excessively, however, may result in slowing down the I/O operations and bringing down the overall efficiency of the system. Such slowing down is mainly due to the root node being frequently locked by the exclusive locks, where every operation starts by taking a lock at the root node. Though certain aspects herein may be described with respect to a B+ tree used in a datastore, it should be noted that the aspects may be applicable to any suitable B+ tree data structure or similar data structure used in other contexts.

Accordingly, the present disclosure provides a highly efficient node locking mechanism for a B+ tree data structure while allowing several other readers and writers to perform I/O operations on the tree data structure. In certain aspects, the provided locking mechanism may use shared locks on as many nodes of the tree as possible (e.g., while traversing the tree) and may acquire exclusive locks only on the node(s) that are to be modified. In some embodiments, when a writer receives an instruction to modify a node, the writer may traverse a search path down the tree from the root node to the requested node. Upon determining that a modification operation has to be performed on the node, the writer may upgrade the shared lock previously obtained on the node to an exclusive lock after determining that no other compute node has locked the node. A modification operation, as will be discussed in more detail below, may include insertion, deletion, update, copy on write (COW), and proactive merge, split, and rebalance operation.

In some embodiments, to ensure that no other compute node has locked a node during a lock upgrade operation, a writer may leverage a counter (e.g., a modification number) that is associated with each node and that is incremented each time its corresponding node is modified. In some such embodiments, the writer may traverse down the search path on the B+ tree and use shared locks in a lock coupling fashion. That is, for each pair of parent-child on the search path, the writer may use shared locks on the parent and its next child unless an exclusive lock is required. Upon determining that an exclusive lock is required on a node (e.g., when the node has to be modified), the writer may read and store a modification number associated with the node before releasing the shared lock on the node. The writer may then attempt to acquire an exclusive lock on the node. After the writer determines that the exclusive lock is acquired on the node, the writer may read the current modification number of the node one more time and compare it with the stored modification number. Only when the current modification number is the same as the stored modification number, the writer may determine that it has successfully acquired the exclusive lock on the node which is exactly the same as the node before the shared lock was released and continue to perform the modification operation on the node. If the modification numbers are different though, the writer of some embodiments may release all the locks (e.g., shared or exclusive) and retry the locking operations from the root node, as will be explained in more detail below.

In some embodiments, a writer may use other factors/parameters instead of, or in conjunction with, the modification number to ensure that a node has not been locked or modified by other servers during a lock upgrade operation. For example, a writer of some embodiments may use a cache address associated with the node (e.g., an address of a memory page in which the node data is stored) as an additional factor to make sure that the node can be acquired in an exclusive lock. In some such embodiments, the writer may read and store both the modification number and cache address associated with a node before releasing the shared lock on the node. After acquiring the exclusive lock on the node, the writer may compare the stored modification number and cache address with the current modification number and cache address of the node. The writer may determine that the exclusive lock is obtained successfully only if both parameters' values (e.g., modification numbers and cache addresses) match the previous parameters' values.

In some embodiments, a writer may be able to acquire an exclusive lock on a node directly and without a need to upgrade the node's lock (e.g., from a shared lock to an exclusive lock). To do so, the writer may use a corresponding (tree) level of each node to determine whether an exclusive lock should be acquired directly for the node instead of first acquiring a shared lock. A node level is the position of the node in a tree. For example, the level number of leaf nodes in a B+ tree is zero, while the root node has the highest level number. The height of a tree is the root level plus one. For example, a tree that has two levels (e.g., with the root node in level 2, middle nodes in level 1, and leaf nodes in level 0) has a height of 3. In some embodiments, every node may store its own level. In some embodiments, during traversing a B+ tree, when a writer reaches a node that has a certain level defined as a threshold, the writer may obtain an exclusive lock on the child node that is placed on the next level directly. For example, more often than not, the modification operations occur on the leaf nodes (e.g., having a level of zero). As such, in some embodiments, the threshold level may be defined as level one. In some such embodiments, when the writer reaches a node that is placed on level one (e.g., the threshold level), the writer may automatically acquire an exclusive lock on the node's child (e.g., which should be a leaf node). This way, by acquiring exclusive locks directly, for example, on the leaf nodes or the deeper level nodes, the cost of converting shared locks to exclusive locks and potential retries from the root node may be avoided.

In some embodiments, a writer may maintain and leverage other parameters associated with the nodes to acquire exclusive locks directly. For example, a reference count or any other indicator associated with a node that indicates whether the node is shared by one or more other trees (e.g., whether the node is cloned) may be used for obtaining exclusive locks. Such an indicator may be used during the descent on a B+ tree search path to enable more efficient COW operations in a concurrent environment (e.g., where multiple servers are performing I/O operations on the tree). In some embodiments, while a writer is using a lock coupling mechanism during the descent on the tree path, the reference count associated with each node may be identified to determine the type of lock that should be acquired on the next child. For example, in a COW operation, when the reference count is greater than 1 (e.g., or an indicator bit is set) for the next child (e.g., that shows the node is shared by another tree), the writer may acquire an exclusive lock directly on the next child node for performing the COW operation. This technique, similar to using a threshold level, as described above, may save the lock conversions (or upgrades) expense and avoid potential retry operations. In some embodiments, the process of checking the reference count of the next child for preemptive acquirement of an exclusive lock may be repeated during the descent of the path, as the COW operation propagates down to the leaf nodes. This locking mechanism in a COW operation may save the lock conversion cost multiple times during the descent (e.g., at least once at each level).

Some embodiments may also provide an optimized retry mechanism in case the process of obtaining an exclusive lock on a particular node fails (e.g., after releasing the shared lock on the node). In some embodiments, a retry counter may be maintained by the I/O compute nodes. In some such embodiments, a writer may increment this counter each time an attempt to convert a shared lock to an exclusive lock fails, where the writer has to retry the whole traversal from the root node one more time. In some embodiments, before each retry, the writer may check the retry counter to determine whether it has crossed a defined threshold limit (e.g., twice, three times, etc.). In some embodiments, when the retry counter is determined to be greater than (or equal to) the defined threshold, the writer may descent on the B+ tree path using only exclusive locks from the start (e.g., from the root node of the tree). This approach may ensure that there is no additional requirements for lock conversion and/or additional retries.

In some embodiments, instead of, or in conjunction with, the above described retry mechanism, a writer may store the level number at which the lock upgrade process has failed and may retry traversing the tree after such failure. In some such embodiments, during the subsequent traversal, the writer may acquire shared locks on the nodes that are on the traversal path (e.g., using a lock coupling mechanism) until the writer reaches a node that is placed on a level that is directly above the stored level. The writer may then acquire an exclusive lock directly on the node that is one level above the stored level number. In some such embodiments, if the exclusive lock can be acquired successfully, then the writer may descent from that level down using exclusive locks on subsequent nodes (e.g., in a lock coupling fashion). If the exclusive lock cannot be acquired during the retry though, the writer may retry the traversal from one level above the level at which the exclusive lock was acquired in the previous attempt. In case of multiple consecutive failures, the retry attempt may eventually reach the root node, in which case the writer may descent on the B+ tree path using only exclusive locks from the start (e.g., from the root node of the tree). This approach may limit the number of possible retries in a single modification operation and may save the cost of frequent retries from the root node.

FIG. 1 is a block diagram illustrating a computer system 100 in which one or more embodiments of the present application may be utilized. Computer system 100 may include a datacenter 102, a secondary datacenter 104, a network 140, several compute nodes 155, an object storage 165, and a metadata storage 134. Network 140 may be, for example, a direct link, a local area network (LAN), a wide area network (WAN), such as the Internet, another type of network, or a combination of one or more of these networks.

Datacenter 102 may include host(s) 105, a virtualization manager 130, a gateway 124, a management network 126, a data network 122, and an object store 116. Networks 122 and 126 may provide Layer 2 or Layer 3 connectivity in accordance with the Open Systems Interconnection (OSI) model, with internal physical or software defined switches and routers not being shown. Although management and data network 126 and 122 are shown as separate physical networks, it is also possible, in some implementations, to logically isolate the management network from the data network, e.g., by using different VLAN identifiers.

Each of hosts 105 may be constructed on a server grade hardware platform 106, such as an x86 architecture platform. For example, hosts 105 may be geographically co-located servers on the same rack. Hardware platform 106 of each host 105 may include components of a computing device such as one or more central processing units (CPUs) 108, system memory 110, a network interface 112, storage system 114, a host bus adapter (HBA) 115, and other I/O devices such as, for example, USB interfaces (not shown). Network interface 112 may enable host 105 to communicate with other devices via a communication medium, such as data network 122 or management network 126. Network interface 112 may include one or more network adapters, also referred to as Network Interface Cards (NICs). In certain embodiments, data network 122 and management network 126 may be different physical networks, as shown, and the hosts 105 may be connected to each of the data network 122 and management network 126 via separate NICs or separate ports on the same NIC. In certain embodiments, data network 122 and management network 126 may correspond to the same physical or software defined network, but different network segments, such as different VLAN segments.

Storage system 114 may represent persistent storage devices (e.g., one or more hard disks, flash memory modules, solid state disks, non-volatile memory express (NVMe) drive, persistent memory devices, and/or optical disks). Storage 114 may be internal to host 105, or may be external to host 105 and shared by a plurality of hosts 105, coupled via HBA 115 or NIC 112, such as over a network. Storage 114 may be a storage area network (SAN) connected to host 105 by way of a distinct storage network (not shown) or via data network 122, e.g., when using iSCSI or FCoE storage protocols. Storage 114 may also be a network-attached storage (NAS) or another network data storage system, which may be accessible via NIC 112.

Local storages 114 housed in, or directly attached to, host machines 105, may provide an aggregate object store 116 for virtual machines (VMs) 120 running on hosts 105. As shown and described, object storage 116 may include combinations of solid state drives (SSDs) or non-volatile memory express (NVMe) drives 117, magnetic or spinning disks or slower/cheaper SSDs 118, or other types of storages. The objects stored in object store 116 may include file system objects and other VM related objects, such as virtual disks (VMDKs) of the VMs, etc.

System memory 110 may be hardware allowing information, such as executable instructions, configurations, and other data, to be stored and retrieved. Memory 110 is where programs and data are kept when CPU 108 is actively using them. Memory 110 may be volatile memory or non-volatile memory. Memory 110 may also include a cache that includes cached copies of storage blocks of objects in storage 114 or object store 116. The cached storage blocks in cache may be fetched into memory 110 during different memory operations, such as memory read/write, deduplication, etc.

A file system may be used to enable applications operating on hosts 104 (e.g., VMs 120) to interact with data stored in storage system 114 and/or storage resources provided by cloud computing system 150. One of a variety of file systems may be used for this purpose. One example is a virtual distributed file system (VDFS), which is a hyper-converged distributed portable operating system interface (POSIX) file system. VDFS refers to an interface between the computation layer (e.g., applications operating on hosts 104) and storage system 114. More specifically, VDFS has two sets of APIs, Southbound APIs (SAPIs) and Northbound APIs (NAPIs). SAPIs enable VDFS to connect with storage system 114, while NAPIs expose different APIs for applications operating on hosts 104 to be able to interact with data store in storage system 114 through VDFS. Note that VDFS is only one example of a file system that can be used to manage data storage in the storage resources provided by on-premise data center 102 and/or cloud computing system 150.

Host 105 may be configured to provide a virtualization layer, also referred to as a hypervisor 116, that abstracts processor, memory, storage, and networking resources of hardware platform 106 into multiple virtual machines 1201 to 120N (collectively referred to as VMs 120 and individually referred to as VM 120) that run concurrently on the same host. Hypervisor 116 may run on top of the operating system in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. In some implementations, the hypervisor may comprise system level software as well as a "Domain 0" or "Root Partition" virtual machine (not shown) which is a privileged virtual machine that has access to the physical hardware resources of the host and interfaces directly with physical I/O devices using device drivers that reside in the privileged virtual machine.

It should be noted that although the disclosure is described with reference to VMs, the embodiments described herein also apply to other types of virtual computing instances (VCIs), such as containers, Docker containers, data compute nodes, isolated user space instances, namespace containers, and the like. In certain embodiments, instead of VMs 120, the techniques may be performed using containers that run on host 105 without the use of a hypervisor and without the use of a separate guest operating system running on each container.

Virtualization manager 130 may communicate with hosts 105 via a network, shown as a management network 126, and carries out administrative tasks for data center 102 such as managing hosts 105, managing VMs 120 running within each host 105, provisioning VMs, migrating VMs from one host to another host, and load balancing between hosts 105. Virtualization manager 130 may be a computer program that resides and executes in a central server in data center 102 or, alternatively, virtualization manager 130 may run as a virtual computing instance (e.g., a VM) in one of hosts 105. Although shown as a single unit, virtualization manager 130 may be implemented as a distributed or clustered system. That is, virtualization manager 130 may include multiple servers or virtual computing instances that implement management plane functions.

Although hosts 105 are shown as comprising a hypervisor 116 and virtual machines 120, in an embodiment, hosts 105 may comprise a standard operating system instead of a hypervisor 116, and hosts 105 may not comprise VMs 120. In this embodiment, data center 102 may not comprise virtualization manager 130.

Gateway 124 may provide hosts 105, VMs 120, and other components in data center 102 with connectivity to one or more networks used to communicate with one or more remote datacenters and/or other devices/servers, such object storage 165, compute nodes 155, secondary datacenter 104, etc., for example, through network 140. Gateway 124 may manage external public Internet Protocol (IP) addresses for VMs 120 and route traffic incoming to and outgoing from data center 102 and provide networking services, such as firewalls, network address translation (NAT), dynamic host configuration protocol (DHCP), and load balancing. Gateway 124 may use data network 122 to transmit data network packets to hosts 105. Gateway 124 may be a virtual appliance, a physical device, or a software module running within host 105.

Host 105 may also include an uploader manager 135 which may manage uploading data to object storage 165 and compute nodes 155 for using additional storage and/or backing up the data in some embodiments. Although shown as a VM, uploader manager 135 may be any other type of VCI, such as a container, a data compute node, an isolated user space instance, etc., in some embodiments. Additionally, uploader manager 135 may be an agent (e.g., a module) running in hypervisor 116 (or other operating system) of host 105 in some embodiments. In some embodiments, uploader manager 135 may be part (e.g., a submodule) of a storage management module (also referred to as a vSAN module) that automates storage management workflows (e.g., creates objects in object store 116, etc.) and provides access to objects in object store 116 (e.g., handle I/O operations on objects in the object store, etc.) based on predefined storage policies specified for objects in the object store. For example, because a VM may be initially configured by an administrator to have specific storage requirements for its "virtual disk" depending on its intended use (e.g., capacity, availability, input/output operations per second (IOPS), etc.), the administrator may define a storage profile or policy for each VM specifying such availability, capacity, IOPS and the like. As such, the vSAN module may then create an "object" for the specified virtual disk by backing it with physical storage resources of object store 116 based on the defined policy.

Uploader manager 135 may receive object data stored in object store 116 and send the data to object storage 165 (e.g., in the cloud) to be stored as backup data for the object. In some embodiments, a log-structured file system (LFS) data structure may be used to store the object data. The data may include different snapshots (e.g., backups, delta backups containing only changed data since a previous backup, etc.) of the object taken at different points of time. In some embodiments, uploader manager 135 may send the first snapshot of the object to the data storage 165 and subsequently send only the snapshot differences (may also be referred to as "snapshot diffs", or "diffs") to the data storage to be backed up. Additionally, in some embodiments, uploader manager 135 may send information (e.g., metadata) associated with the object, such as object ID, snapshot ID, logical block addresses (LBAs) in which the object is stored, etc., to a set of one or more compute nodes 155. In some embodiments, in addition to objects and their snapshots, uploader manager 135 may store files (and their snapshots) in object storage 165 or another remote storage for backup purposes and send information associated with the stored files to compute nodes 155 to create, manage, and store metadata associated with the files. In some embodiments, a B+ tree data structure may be used to store the metadata.

The objects may be stored in an LFS format in object storage 165, for example, in a set of one or more segments as multiple chunks of data. In some embodiments, each object may be stored in fixed block sizes of data (e.g., each block being approximately 4 kilobyte (KB)) in one or more segments that have fixed segment sizes (e.g., approximately 4 megabyte (MB) for each segment) in object storage 165. Each fixed block size may also be called a chunk of data or simply a chunk in some embodiments. It should be noted that when files are stored in object storage 165 (or any other storage), the chunks may have different sizes (e.g., that are defined on a byte-boundary basis using, for example, robin hash fingerprints).

In some embodiments, the set of compute nodes may receive information (e.g., metadata) associated with the objects that are stored in object storage 165 (e.g., as a plurality of chunks), generate additional metadata associated with each object based on the received information, and store the metadata in a B+ tree data structure in metadata storage 134. Metadata storage 155 and object storage 165, in some embodiments, may be stored in public cloud (e.g., Amazon S3) even though they are separate storages. Additionally, the metadata storage and object storage may be part of storage resources of a cloud computing system that in combination with datacenter 102 may render a hybrid cloud. For example, the hybrid cloud may include a public cloud (not shown in the figure) and an on-premise datacenter, such as datacenter 102.

It should be noted that in some embodiments, as described above, the object data and its associated metadata may not necessarily be only backup data. For example, instead of, or in conjunction with, the backup data, the object data and its associated metadata may include original data related to the objects that are stored in the public cloud, for example, due to lack of enough space in datacenter 102. For example, because storage resources provided by on-premise datacenter 102 may be limited, data produced or stored within on-premise datacenter 102 may, in certain cases, be transmitted to a cloud computing system for storage in storages 134 and 165 among other storage resources of the public cloud. In such cases, a file system(s) (e.g., a distributed file system, such as VDFS) operating within on-premise datacenter 102 may be configured to utilize storage resources of the public cloud as secondary storage resources. In one example, the file system may be configured to cache hot data in object store 116 and overflow cold data into storage resources of the public cloud including storage 165. In other words, in the aforementioned example, object storage 116 may be used by the file system as a read cache and write-back staging area, while the storage resources of the public cloud may be treated as disk storage. Hot data may refer to data that is frequently accessed, while cold data may refer to data that is accessed less often.

In case of a failure in datacenter 102 (e.g., when part or all of the data stored in object store 116 is damaged or lost, when datacenter 102 is under a cyber-attack, etc.), a secondary or recovery datacenter, such as secondary datacenter 104, may use the metadata stored in the metadata storage 134 to retrieve the backed up data (e.g., objects and/or files) stored in object storage 165. After retrieving the backup data (e.g., snapshots of the VMDKs), secondary datacenter 104 may use the data to recreate the objects (e.g., the virtual disks) and run the VMs of datacenter 102. The organization of metadata in metadata storage 134 and object data in object storage 165 may allow secondary datacenter 104 to be up and running in a short period of time after any failure in the primary datacenter 102.

As shown in FIG. 1, compute nodes 155 may interact with metadata storage 134 to create, update, and manage metadata data structures. In some embodiments, all or some of the metadata data structures stored in metadata storage 134 may be key-value data structures. A key-value data structure may include a data structure ordered by keys that when given a key, may return a value that is mapped to that key. Each key-value data structure may use a B+ tree data structure for rendering faster I/O operations (e.g., insertion, deletion, and updating the data) in some embodiments. Below, with reference to FIG. 2, a B+ tree data structure is described.

Figure 2:
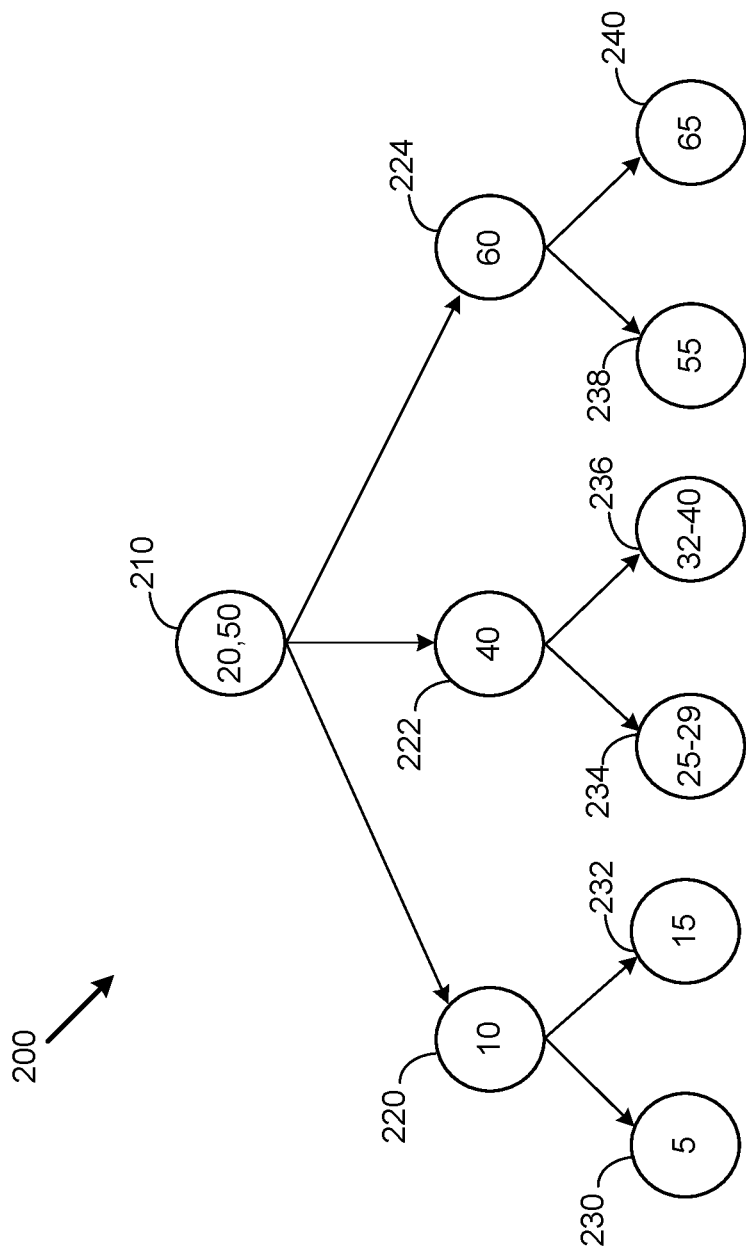
FIG. 2 is a block diagram illustrating a B+ tree data structure, according to an example embodiment of the present application.

FIG. 2 is a block diagram illustrating a B+ tree 200 data structure, according to an example embodiment of the present application. As illustrated, B+ tree 200 may include a plurality of nodes connected in a branching tree structure. Each node may have one parent and two or more children. The top node of a B+ tree may be referred as root node 210, which has no parent node. The middle level of B+ tree 200 may include middle nodes 220, 222, and 224, which may have both parent and child nodes. In the illustrated example, B+ tree 200 has only two levels, and thus only a single middle level, but other B+ trees may have more middle levels and thus greater heights. The bottom level of B+ tree 200 may include leaf nodes 230-240 (e.g., may also be referred to as leaves) which do not have any more children. In the illustrated example, in total, B+ tree 200 has 10 nodes, two levels, and a height of three. Root node 210 is in level 2 of the tree, middle (or index) nodes 220-224 are in level 1 of the tree, and leaf nodes 230-240 are in level 0 of the tree.

Each node of B+ tree 200 may store at least one tuple. In a B+ tree, leaf nodes may contain data values (or real data) and internal (or middle) nodes may contain only indexing keys. For example, each of leaf nodes 230-240 may store at least one tuple that includes a key mapped to real data, or mapped to a pointer to real data, for example, stored in a memory or disk. In some embodiments, each leaf node may also include a pointer to its sibling(s), which is not shown for simplicity of description. On the other hand, a tuple in the middle and/or root nodes of B+ tree 200 may store an indexing key and one or more pointers to its child node(s), which can be used to locate a given tuple that is stored in a child node.

As described, each node may include one or more tuples. For example, root node 210, as shown in the figure, includes two tuples having keys 20 and 50. These tuples may indicate that tuples with keys less than 20 can be found by accessing middle node 220 on the left hand side, tuples with keys between 20 and 50 can be found by accessing middle node 222 in the middle, and tuples with keys greater than 50 can be found by accessing middle node 224 in the right hand side. Tuples in all nodes of B+ tree 200 may be sorted based on their keys. For example, a first tuple with a first key in a particular node may be stored prior to a second tuple with a second key in the node, if the second key is larger than the first key. An example of this is shown in root node 210 of B+ tree 200, where the tuple with key 20 is stored prior to the tuple with key 50.

Because B+ tree 200 contains sorted tuples, a read operation such as a scan or a query to B+ tree 200 may be completed by traversing the B+ tree relatively quickly to read the desired tuple, or the desired range of tuples, based on the corresponding key or starting key. For example, a reader/writer server with access to B+ tree 200, such as compute node 155 shown in FIG. 1, may receive a scan query to read tuple 26 (e.g., tuple with key 26) to tuple 33. In such an example, the reader may start with root node 210 and, based on the tuples therein, the reader may determine to traverse to middle node 222 because the starting key of the scan query is 26, which is larger than 20 and smaller than 50. Next, by examining middle node 222, the reader may determine that tuple 26 is in leaf node 234. As such, the reader may begin reading tuple 26 and move to tuple 27 and so on until tuple 29 in leaf node 234 is read. Once tuple 29 is read, the reader may determine that the scan operation is not completed and that additional tuples have to be read.

In some embodiments, as described above, B+ tree 200 may be structured such that a pointer may be placed at the end of each leaf node, where the pointer points to the storage location of the next (or sibling) leaf node. For example, a pointer may be included at the end of leaf node 234, such that after reading the last tuple 29 in node 234, the reader may read the pointer and identify the storage location of leaf node 236. Based on such identification, the reader may locate the storage location of leaf node 236 and read tuples 32 and 33 (there are no tuples 30 or 31 in either of nodes 234 and 236, as can be seen in the figure) to complete the scan query.

As described above, as the nodes of a B+ tree may be concurrently accessed by multiple readers/writers, each reader and/or writer may use a locking mechanism, such as lock coupling to traverse or scan a search path on the tree. The types of locks that the readers/writers use on a parent-child pair in while traversing the tree are often either shared locks or exclusive locks. Using exclusive locks, however, may block other readers/writers and slow down their I/O operations. To increase the I/O operations' efficiency in a highly concurrent environment, some embodiments may provide a locking mechanism in which shared locks are obtained on the parent-child pairs, and only when certain condition(s) are met an exclusive lock is obtained or the shared lock of a node (e.g., the child node or both the parent and child nodes) is upgraded to the exclusive lock.

Figure 3:
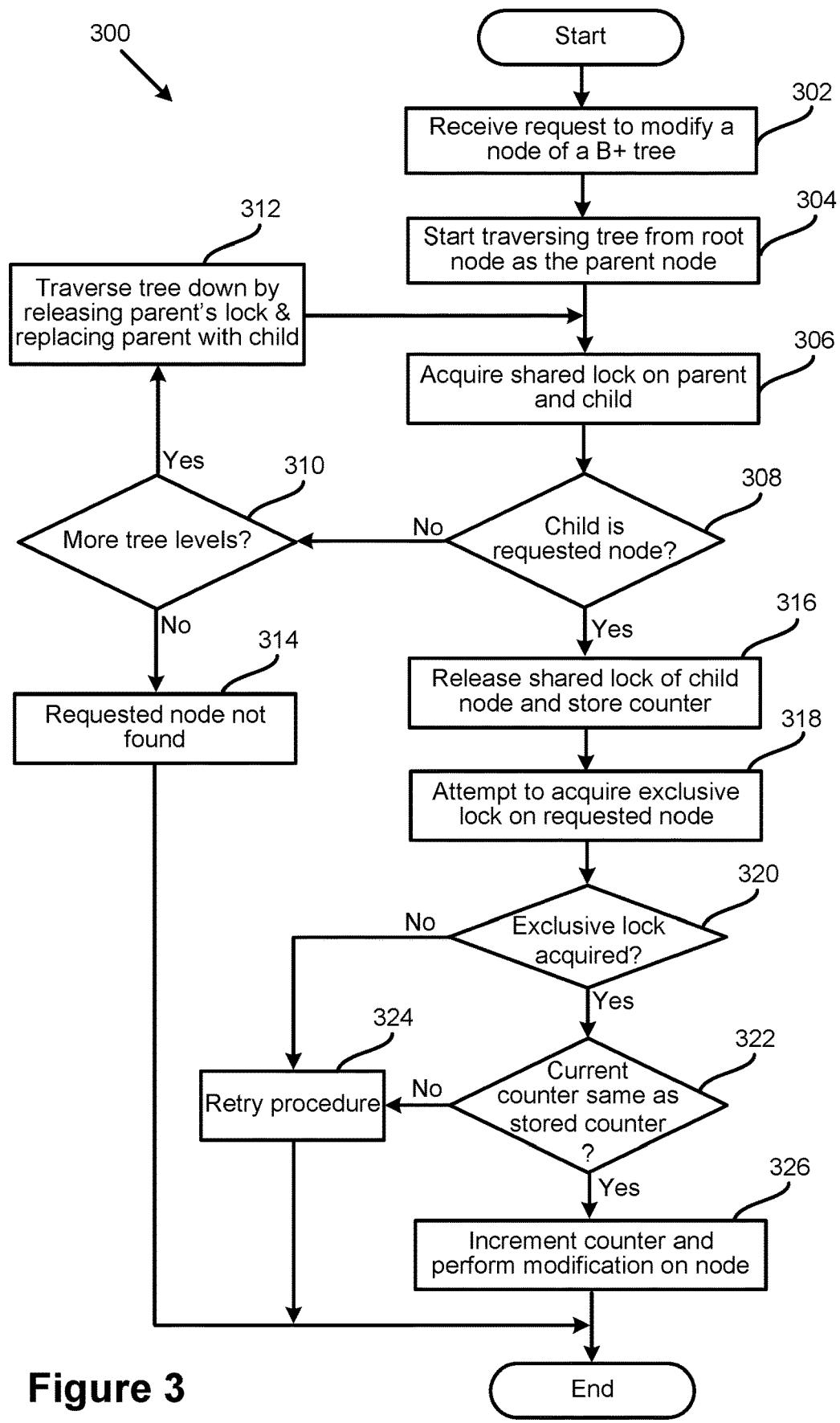
FIG. 3 is a flowchart illustrating a method (or process) for implementing an efficient locking mechanism on the nodes of a B+ tree while traversing a search path on the tree, according to an example embodiment of the present application.

FIG. 3 is a flowchart illustrating a method (or process) 300 for implementing an efficient locking mechanism on the nodes of a B+ tree while traversing a search path on the tree, according to an example embodiment of the present application. Process 300 may be performed by a compute node, such as compute node 155, as described above with reference to FIG. 1 in some embodiments. A compute node may include a physical computing device, such as an individual server or a host machine (e.g., that hosts several VCIs). The compute node may also be a VCI, such as a VM, a container, etc. The host machine may be any of hosts 105 shown in datacenter 102 (in FIG. 1) or a host machine of a public cloud (e.g., when utilizing a hybrid cloud architecture). Similarly, the VCI may be a VCI running in any of hosts 105, or any host in the public cloud.

Process 300 may start by receiving, at 302, a request to modify a node of a B+ tree. As described above, the B+ tree may be a data structure used for a key-value data structure that stores metadata associated with an object, such as a virtual disk of a VM. The requested modification may include insertion of a node, deletion of a node, updating the data of a node. Additionally, the locking mechanism described herein may also apply to a COW operation or a proactive merge, split, and rebalance operation that may be associated with the requested modification, as further described below. As an example for a proactive split, a writer may receive a request to insert a node in a B+ tree. After receiving the request and while traversing down a search path on the tree, the writer may split a second node that is on the search path proactively before reaching the point on the tree in which the requested node should be inserted.

After receiving the request at 302, the process may start, at 304, traversing the tree from the root node as the first parent node. Operations of process 300 will be described below with reference to tree 200 shown in FIG. 2 as an example. For example, process 300 may receive a request to update the data in node 240. The request may include, for example, key 65 and the new data that should replace the existing data in node 240. After receiving the request, process 300 may start traversing down tree 200 by determining root 210 as the first parent and node 224 as its next child (e.g., since key 65 is greater than key 50 which is part of the second tuple in root node 210).

While traversing the tree, process 300 may acquire, at 306, a shared lock on the pair of parent-child on the search path. With reference to FIG. 2, the process may acquire a shared lock on both node 210 (as the parent) and node 224 (as the child). Next, process 300 may determine, at 308, whether the child is the requested node. If the process determines that the child is the requested node, the process may proceed to 316, which is described below. However, if process 300 determines that the child is not the requested node, the process may determine, at 310, whether it has reached the end of the tree (e.g., level 0). If the process determines that the end of the tree has been reached, the process may perform, at 314, a set of one or more operations that indicate the requested node is not found. For example, the process may send a message indicating that the requested node is not found. However, when process 300 determines, at 310, that there are more levels in the tree to be scanned, the process may continue traversing, at 312, the tree by releasing the shared lock of the parent and replacing the parent with its next child before returning to operation 306, for example, to acquire new shared locks on the next pair of parent-child on the search path.

With reference to FIG. 2, the process determines whether the child having key 60 is the requested node. After determining that node 224 is not the requested node and also it is not in level 0, process 300 may release the shared lock on root node 210 and set node 224 as the new parent. The process may then, in a similar fashion as described above, obtain shared locks on node 224 and its next child, node 240. This time, however, the process may determine that the new child is the same node as indicated in the I/O operation request. As such, the process may proceed to operation 316.

At 316, process 300 may release the shared lock of the child node (e.g., node 240) to upgrade the lock to an exclusive lock. The process may read a modification number associated with the node and store the modification number (e.g., in a file stored on a disk) before releasing the shared lock on the node. A modification number (or counter) associated with each node may include a counter that indicates how many times its corresponding node has been modified. Thus, each time a node is changed, the compute node that has changed the node may increment the modification number.

After storing the modification number, process 300 may attempt, at 318, to acquire an exclusive lock on the node (e.g., node 240). The process may not always be able to acquire an exclusive lock on the node upon the first try since, as described above, other readers/writers may be performing I/O operations on the same node at the same time. After the attempt, process 300 may determine, at 320, whether the exclusive lock is obtained on the node. If the process determines that it has not been successful in obtaining the exclusive lock, the process may start, at 324, a retry procedure and then end. On the other hand, if process 300 determines that an exclusive lock has been obtained on the node, the process may read the current modification number associated with the node in order to determine, at 322, whether the current modification number of the node is the same as the stored modification number.

The process may compare the current modification number with the stored number to ensure no other compute node has changed the node during the time that the process has released the shared lock and obtained the exclusive lock. If process 300 determines that the current modification number is not the same as the stored modification number, the process may proceed to operation 324 to start a retry procedure. However, when process 300 determines that the current modification number is the same as the stored modification number, the process may determine that the lock upgrade procedure was successful and as a result, increment the current modification number associated with the node, and then perform the requested modification on the node (e.g., update the data associated with key 65 in node 240). The process may then end.

As described above, in some embodiments, before a modification on a node (e.g., an insert node) operation is performed, nodes may be proactively split, merged, or rebalanced while traversing down a B+ tree from the root node. Proactive insertion, merging, and rebalancing may help in preventing an upward or reverse traversal of a B+ tree, for example, to rebalance the tree. In some embodiments, a threshold split or merge number may be set for the nodes of each level of the tree. That is, the nodes in each level of a B+ tree may be assigned a different threshold number for splitting (or merging) compared to the nodes of other levels. In some embodiments, the threshold split (or merge) number for all of the nodes of all levels of the tree may be the same though.

In some embodiments, when a node with the threshold number of entries (or tuples) is reached while traversing down the tree, the node may be split, for example, in anticipation of the modification operation requiring a splitting of the node. For example, with reference to FIG. 1, if the split threshold is defined to be two (e.g., maximum of two tuples), and a node having a key 63 is to be inserted to the three (e.g., as a new leaf node), when a writer starts traversing the tree from the root node, the writer may determine that the root node has the threshold number of entries and as such may split the root node to two nodes each having one tuple and generate a new root node with the split nodes as children. As another example, assume that a node X in the middle of tree 200 (e.g., in level one of the tree next to node 224) has two tuples having keys 80 and 90. Also assume that a node having key 100 has to be inserted as a leaf node one level below node X. In such as example, when the writer starts traversing the tree, the writer may acquire shared locks on the root node that is the parent and node X as the child. At the same time, the writer may determine that the number of tuples in node X is equal to the threshold number of tuples. As such, the writer may determine that node X has to be proactively split. But since after node X is split, its parent (e.g., root node 210) has to point to both node X and the new node (e.g., node X'), not only does the lock on node X have to be upgraded, but also the lock of the parent node has to be upgraded as well (e.g., since the parent node is going to be updated too). As such, for this proactive splitting of node X, process 300 may have to be performed, as described above with reference to FIG. 3, to obtain an exclusive lock on both parent root node 210 and its child, node X.

In a similar fashion as described above for proactive splitting of the nodes, merging of the nodes of a B+ tree may also be done proactively. For example, when a node of a B+ tree is to be removed, multiple nodes can be proactively merged while traversing down the tree from the root node to the leaf nodes. For example, during the traversal, if a node with a threshold minimum number of entries is reached, the node may receive additional entries redistributed from its sibling nodes or the entries of the node may be merged into its sibling nodes in anticipation of the requested removal of the node requiring merging of the nodes.

The specific operations of process 300 may not be performed in the exact order shown and described. Additionally, the specific operations may not be performed in one continuous series of operations, and different specific operations may be performed in different embodiments. For example, in some embodiments, a compute node may use additional parameters (e.g., in addition to the modification number) to ensure that a node has not been locked or modified by other compute nodes during a lock upgrade operation. For example, a writer may use a cache address associated with the node as an additional parameter to make sure that the node can be acquired in an exclusive lock. In some such embodiments, the writer may read and store both the modification number and cache address associated with a node before releasing the shared lock on the node. After acquiring the exclusive lock on the node, the writer may compare the stored modification number and cache address with the current modification number and cache address of the node. The writer may determine that the exclusive lock is obtained successfully only when the current modification number and cache addresses are the same as the stored modification number and cache addresses.

Figure 4:
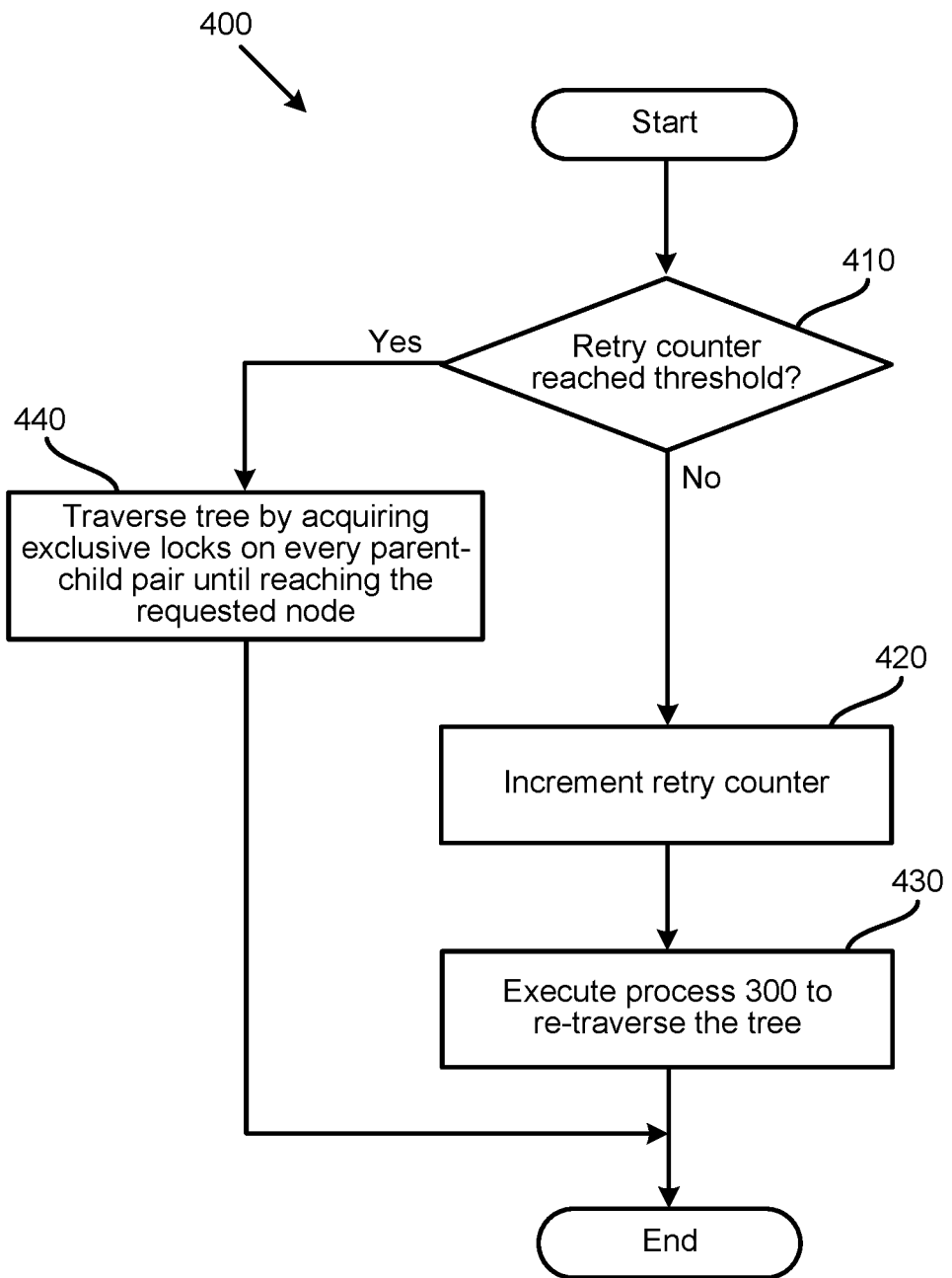
FIG. 4 is a flowchart illustrating a method (or process) for retrying to obtain an exclusive lock on one or more nodes of a B+ tree when a first attempt to do so has failed, according to an example embodiment of the present application.

FIG. 4 is a flowchart illustrating a method (or process) 400 for retrying to obtain an exclusive lock on one or more nodes of a B+ tree when a first attempt to do so has failed, according to an example embodiment of the present application. Process 400 may be performed by a compute node, such as compute node 155, as described above with reference to FIG. 1 in some embodiments. As described above with reference to FIG. 3, when process 300 determines that it has not been successful in obtaining an exclusive lock, or when the process obtains the exclusive lock, but determines that the current modification number associated with the node is not the same as the stored modification number, the process may perform a retry procedure.

Process 400 may start by determining, at 410, whether a retry counter is equal to, or greater than, a threshold. The retry threshold may be defined for a B+ and may indicate how many times a compute node should re-traverse the tree before giving up on obtaining a lock on one or more nodes of the tree. When process 400 determines, at 410, that the threshold number of retries has not been reached yet, the process may increment, at 420, the retry counter and then re-traverse the B+ tree in a similar fashion as described above with reference to FIG. 3. That is, the process may perform all the operations 302-326 described above with reference to FIG. 3 to determine whether the exclusive lock for the desired node(s) can be obtained. The process may then end.

When process 400 determines, at 410, that a threshold number of retries has been reached though (e.g., process 300 has been performed for the threshold number of times), the process may start traversing, at 440, the tree by acquiring exclusive locks on every parent-child pair on the search path, until an exclusive lock is also acquired on the requested node (e.g., the node on which the I/O operation has to be performed). That is, instead of acquiring shared locks on parent-child pairs while traversing the tree and only upgrading the last node's lock from shared to exclusive, the process may acquire exclusive locks from the start, in which case no lock upgrading mechanism will be needed. The process may the end.

As described above, in some embodiments, a writer may acquire an exclusive lock on a node directly and without acquiring a shared lock first and then upgrading the shared lock to an exclusive lock. In some such embodiments, the writer may identify the level on which each node is placed to determine whether an exclusive lock can be acquired directly for the node or the node's next child. In some embodiments, level of the nodes may be stored at the node itself, while in some other embodiments, the node levels are stored in some other data structure. In some embodiments, during traversing a B+ tree, when a writer reaches a node that has a certain level defined as a threshold level, the writer may obtain an exclusive lock on the next child of the node. By acquiring exclusive locks directly, the cost of converting shared locks to exclusive locks and potential retries from the root node may be avoided.

Figure 5:
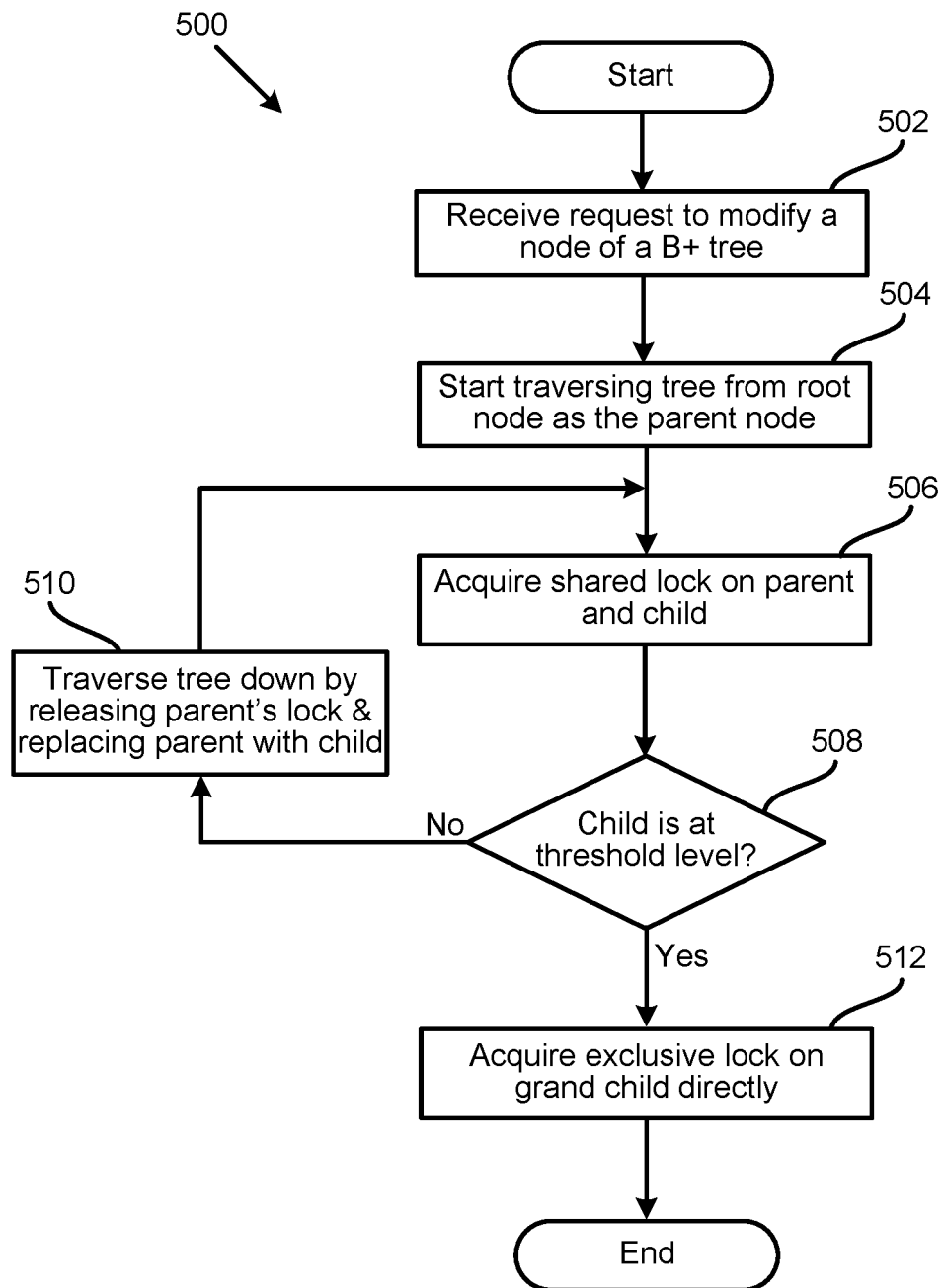
FIG. 5 is a flowchart illustrating a method (or process) for obtaining an exclusive lock on a node of a B+ tree directly and without upgrading the node's lock, according to an example embodiment of the present application.

FIG. 5 is a flowchart illustrating a method (or process) 500 for obtaining an exclusive lock on a node of a B+ tree directly and without upgrading the node's lock, according to an example embodiment of the present application. Process 500 may be performed by a compute node, such as compute node 155, as described above with reference to FIG. 1 in some embodiments. Process 500 may start by receiving, at 502, a request to modify a node of a B+ tree. After receiving the request, the process may start, at 504, traversing the tree from the root node as the first parent node.

While traversing the tree, process 500 may acquire, at 506, a shared lock on the next pair of parent-child on the search path. After acquiring the shared lock on the pair, for each pair, process 500 may determine, at 508, whether any of the parent or child in the pair is placed on a threshold level of the tree. For example, the process may identify level 1 of the tree as a threshold level and as such, may determine whether the child (or parent) in the current pair that is in a shared lock is in level 1. If the child is in level 1, that shows that the nodes in the next level (e.g., the next grandchild) are leaf nodes, where most of the insertions, deletions, and updates occur.

If process 500 determines, at 508, that the locked child is not placed on the threshold level (e.g., the threshold level has not been reached yet on the traversal path), the process may continue traversing, at 510, the tree down by releasing the shared lock of the parent and replacing the parent with its next child before returning to operation 506, for example, to acquire new shared locks on the next pair of parent-child on the search path. On the other hand, when process 500 determines, at 508, that the child is placed on the threshold level, the process may acquire, at 512, an exclusive lock on the next child of the child node (e.g., the grandchild of the parent in the parent-child pair) directly. The process may then end. Acquiring an exclusive lock in this way may enable the writer to perform a modification operation on the node in the exclusive lock right away and without performing any additional operations to upgrade the lock on the node first.

In some embodiments, a writer may use other parameters associated with the nodes to acquire exclusive locks directly.

For example, a reference count (or any other indicator, such as a set of one or more status bits) associated with a node may indicate whether the node is shared by another tree (e.g., when the node is cloned). In some embodiments, while a writer is using a lock coupling mechanism during traversing a B+ tree, the reference count associated with each node may be used to determine the type of lock that needs to be acquired on the next child. For example, in a COW operation, when the reference count is greater than 1 (or a status bit is set) for the next child, the writer may acquire an exclusive lock directly on the next child node for performing the COW operation.

Figure 6:
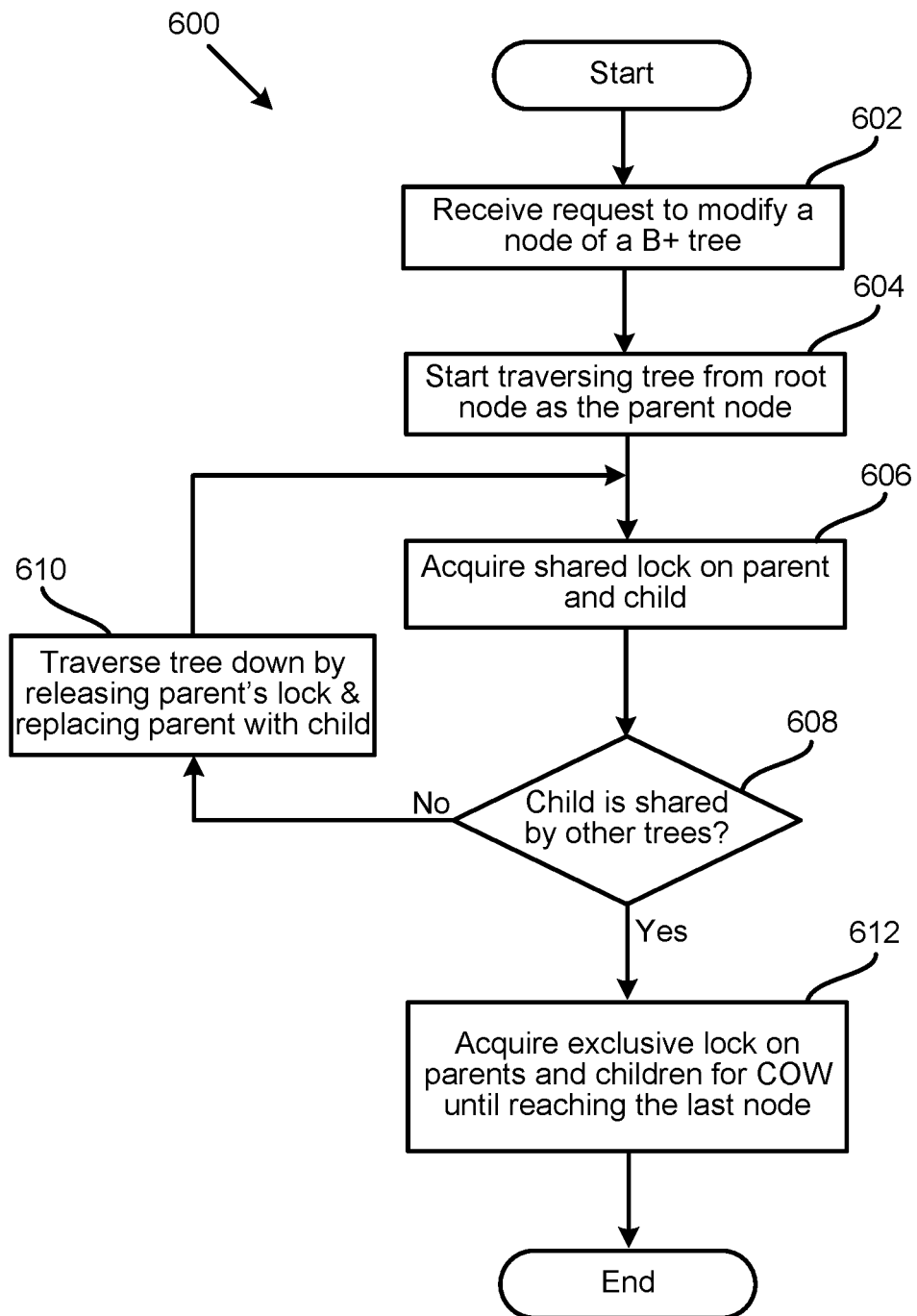
FIG. 6 is a flowchart illustrating a method (or process) for obtaining an exclusive lock on a node of a B+ tree directly in a COW operation, according to an example embodiment of the present application.

FIG. 6 is a flowchart illustrating a method (or process) 600 for obtaining an exclusive lock on a node of a B+ tree directly in a COW operation, according to an example embodiment of the present application. Process 600 may be performed by a compute node, such as compute node 155, as described above with reference to FIG. 1 in some embodiments.

Process 600 may start by receiving, at 602, a request to modify a node of a B+ tree. After receiving the request, the process may start, at 604, traversing the tree from the root node as the first parent node. While traversing the tree, process 600 may acquire, at 606, a shared lock on the next pair of parent-child on the search path. After acquiring the shared lock on the pair, for each pair, process 600 may determine, at 608, whether the child in the pair of parent-child is shared by any other tree. For example, the process may read a reference number (or any other indicator) that is associated with the child node and that shows the sharing status of the child node. If the reference counter is greater than one, that shows that the child node in shared by at least one other three.

If process 600 determines, at 608, that the locked child is not shared by any other tree, the process may continue traversing, at 610, the tree down by releasing the shared lock of the parent and replacing the parent with its next child before returning to operation 606, for example, to acquire new shared locks on the next pair of parent-child on the search path. On the other hand, when process 600 determines, at 608, that the child is shared by at least one other tree, the process may acquire, at 512, an exclusive lock on both the parent node and the child node and continue on acquiring exclusive locks on the next parent-child nodes that participate in the COW operation while traversing down the tree. The process may then end. An example of process 600 is described below with reference to FIG. 7.

Figure 7:
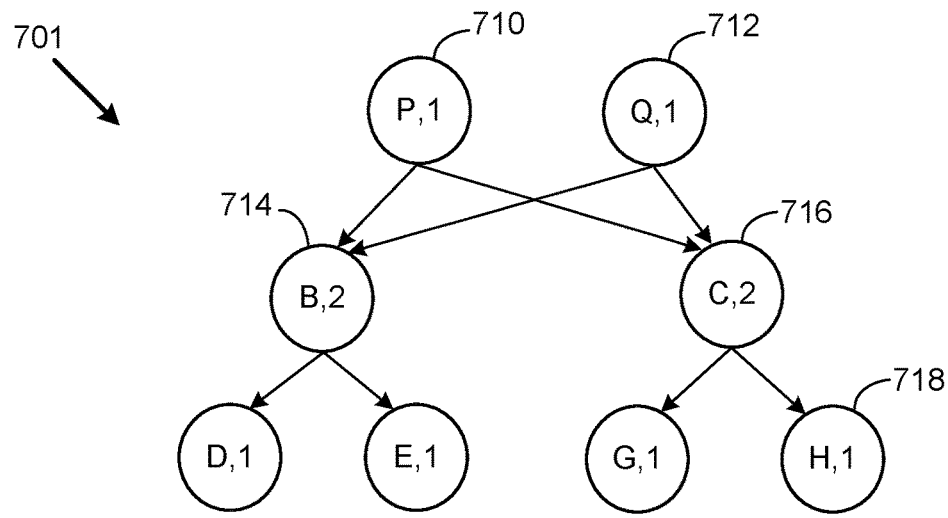
FIG. 7 illustrates in three block diagrams a locking mechanism on the nodes of a B+ tree that participate in a COW operation, according to an example embodiment of the present application.
Figure 7:
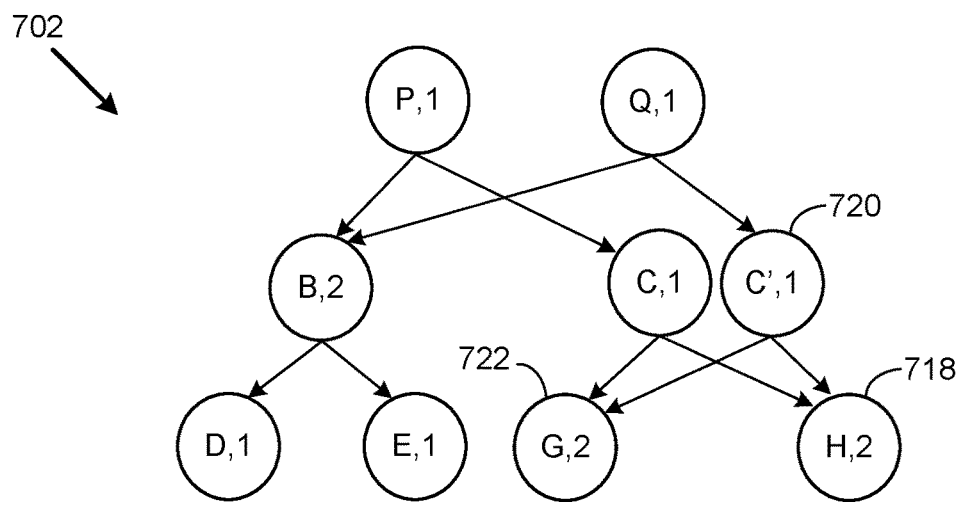
Figure 7:
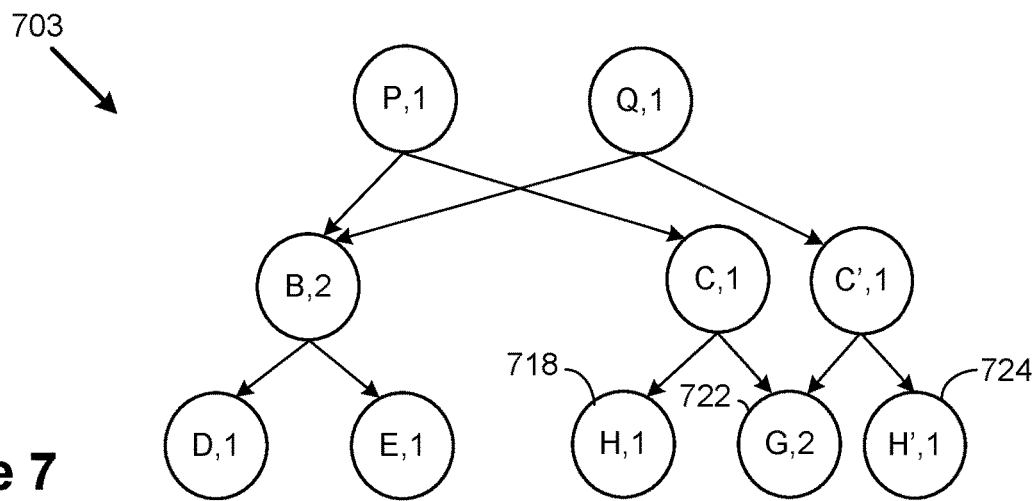

FIG. 7 illustrates in three block diagrams 701-703 a locking mechanism on the nodes of a tree that participate in a COW operation, according to an example embodiment of the present application. More specifically, diagram 710 illustrates a B+ tree in which the middle nodes 714 and 716 are shared by root node 710 of a first B+ tree and root node 712 of a second B+ tree generated as a clone of the first B+ tree. This way, the two root nodes may share the data of the tree without having to duplicate the whole data of the tree. As shown in the figure, each node is shared between the two trees has a reference count of 2 (e.g., B,2 and C,2), while other nodes have a reference count of 1 (e.g., D,1 and E,1).

When a compute node (e.g., a write) receives an I/O instruction to modify leaf node 718 (e.g., node H, 1) of the second B+ tree, the compute node may first acquire a shared lock on both root node 712 and child node 716, as described above with reference to FIG. 6. The writer may then determine that the reference count of the child node is 2, which indicates the child is shared by another tree. As such, as shown in block diagram 702, the writer may start a COW operation in which the locks on both parent and child have to be upgraded to an exclusive lock, as described above. After a successful lock upgrade, the writer may generate and insert a duplicate node 720 as clone of node 716 and have root node 712 point to this new node 720 instead of the original node 716. The new node 720 may also include pointers that point to leaf nodes 718 and 722. Since these two leaf nodes are shared by both nodes 716 and 720, as the result of the COW operation, the reference counters for the leaf nodes may be incremented (e.g., from 1 to 2) accordingly. Conversely, since the nodes 716 and 720 are not shared by the root nodes 710 and 712, their reference counters are set to be one now.

Block diagram 703 illustrates the remainder of the traversal of the writer on the tree for modifying node 718. Since the reference counter for leaf node 718 is set to 2, the writer may directly acquire an exclusive lock for this node. Additionally, since the node is in the COW operation, any modification to this node has to be performed on a duplicate of the node. As such, the writer may generate and insert a duplicate leaf node 724 of original leaf node 718, while the original leaf node 718 is in an exclusive lock. Additionally, the writer may add a pointer to parent node 720 (e.g., while this node is in an exclusive lock too) to point to the new leaf node 724. Thereafter, the write may perform any modification that is indicated in the requested I/O operation on the duplicate node 724 (e.g., instead of on original leaf node 718). As can be seen in diagram 703, the reference counter for leaf nodes 718 and 724 which are not shared by multiple parents are set to 1 now, while the reference counter for leaf node 722 which is shared by both parent nodes 716 and 720 stays the same number 2.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory, persistent memory, solid state disk (e.g., a flash memory device), NVMe device, a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for modifying a particular node of a B+ tree comprising a plurality of nodes placed in a plurality of levels, wherein a root node is placed in a highest level of the B+ tree, comprising:
receiving a request to modify the particular node placed in a level that is at least one level below the root node;
starting to traverse a path on the B+ tree from the root node toward the particular node;
while traversing the path:
acquiring shared locks on each pair of nodes, including a corresponding parent node and a corresponding child node, that is not shared with another tree or is above a threshold level in the B+ tree until it is determined a first child node of a first pair of nodes is shared with another tree or is at the threshold level; and
obtaining an exclusive lock on a second child node that is a child of the first child node, wherein the second child node is at least one level above the particular node or is the particular node; and
modifying the particular node based on the request.

2. The method of claim 1, wherein acquiring shared locks on each pair of nodes comprises acquiring shared locks on each pair of nodes that is not shared with another tree.

3. The method of claim 2, wherein it is determined the first child node is shared with another tree based on a reference count associated with the first child node.

4. The method of claim 1, wherein acquiring shared locks on each pair of nodes comprises acquiring shared locks on each pair of nodes that is above the threshold level.

5. The method of claim 4, wherein the threshold level is one level above a level including leaf nodes of the B+ tree.

6. The method of claim 1, further comprising, prior to obtaining the exclusive lock on the second child node, releasing a first shared lock on a first parent node of the first pair of nodes.

7. The method of claim 1, wherein acquiring shared locks on each pair of nodes comprises:
acquiring a first shared lock on a first node;
acquiring a second shared lock on a second node that is a child of the first node;
releasing the first shared lock on the first node; and
acquiring a third shared lock on a third node that is a child of the second node.

8. A computer system, comprising:
at least one memory; and
at least one processor coupled to the at least one memory, the at least one processor being configured to perform operations for modifying a particular node of a B+ tree comprising a plurality of nodes placed in a plurality of levels, wherein a root node is placed in a highest level of the B+ tree, comprising:
receiving a request to modify the particular node placed in a level that is at least one level below the root node;
starting to traverse a path on the B+ tree from the root node toward the particular node;
while traversing the path:
acquiring shared locks on each pair of nodes, including a corresponding parent node and a corresponding child node, that is not shared with another tree or is above a threshold level in the B+ tree until it is determined a first child node of a first pair of nodes is shared with another tree or is at the threshold level; and
obtaining an exclusive lock on a second child node that is a child of the first child node, wherein the second child node is at least one level above the particular node or is the particular node; and
modifying the particular node based on the request.

9. The computer system of claim 8, wherein acquiring shared locks on each pair of nodes comprises acquiring shared locks on each pair of nodes that is not shared with another tree.

10. The computer system of claim 9, wherein it is determined the first child node is shared with another tree based on a reference count associated with the first child node.

11. The computer system of claim 8, wherein acquiring shared locks on each pair of nodes comprises acquiring shared locks on each pair of nodes that is above the threshold level.

12. The computer system of claim 11, wherein the threshold level is one level above a level including leaf nodes of the B+ tree.

13. The computer system of claim 8, the operations further comprising, prior to obtaining the exclusive lock on the second child node, releasing a first shared lock on a first parent node of the first pair of nodes.

14. The computer system of claim 8, wherein acquiring shared locks on each pair of nodes comprises:
acquiring a first shared lock on a first node;
acquiring a second shared lock on a second node that is a child of the first node;
releasing the first shared lock on the first node; and
acquiring a third shared lock on a third node that is a child of the second node.

15. One or more non-transitory computer-readable media comprising instructions, which when executed by one or more processors, cause the one or more processors to perform operations for modifying a particular node of a B+ tree comprising a plurality of nodes placed in a plurality of levels, wherein a root node is placed in a highest level of the B+ tree, comprising:
receiving a request to modify the particular node placed in a level that is at least one level below the root node;
starting to traverse a path on the B+ tree from the root node toward the particular node;
while traversing the path:
acquiring shared locks on each pair of nodes, including a corresponding parent node and a corresponding child node, that is not shared with another tree or is above a threshold level in the B+ tree until it is determined a first child node of a first pair of nodes is shared with another tree or is at the threshold level; and obtaining an exclusive lock on a second child node that is a child of the first child node, wherein the second child node is at least one level above the particular node or is the particular node; and modifying the particular node based on the request.

16. The one or more non-transitory computer-readable media of claim 15, wherein acquiring shared locks on each pair of nodes comprises acquiring shared locks on each pair of nodes that is not shared with another tree.

17. The one or more non-transitory computer-readable media of claim 16, wherein it is determined the first child node is shared with another tree based on a reference count associated with the first child node.

18. The one or more non-transitory computer-readable media of claim 15, wherein acquiring shared locks on each pair of nodes comprises acquiring shared locks on each pair of nodes that is above the threshold level.

19. The one or more non-transitory computer-readable media of claim 18, wherein the threshold level is one level above a level including leaf nodes of the B+ tree.

20. The one or more non-transitory computer-readable media of claim 15, the operations further comprising, prior to obtaining the exclusive lock on the second child node, releasing a first shared lock on a first parent node of the first pair of nodes.

* * * * *